US009297311B2

(12) United States Patent
Hellat et al.

(10) Patent No.: US 9,297,311 B2
(45) Date of Patent: Mar. 29, 2016

(54) GAS TURBINE POWER PLANT WITH FLUE GAS RECIRCULATION AND OXYGEN-DEPLETED COOLING GAS

(75) Inventors: Jaan Hellat, Baden-Ruetihof (CH); Stefan Rofka, Nussbaumen (CH); Michael Hoevel, Lengnau AG (CH); Eribert Benz, Birmenstorf (CH); Andre Burdet, Villars sur Glane (CH); Frank Sander, Rieden AG (CH); Felix Guethe, Basel (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 855 days.

(21) Appl. No.: 13/426,043

(22) Filed: Mar. 21, 2012

(65) Prior Publication Data

US 2012/0240590 A1    Sep. 27, 2012

(30) Foreign Application Priority Data

Mar. 22, 2011    (CH) .......................................... 482/11

(51) Int. Cl.
| F02C 7/143 | (2006.01) |
| F02C 1/08 | (2006.01) |
| F02C 3/30 | (2006.01) |
| F01D 25/08 | (2006.01) |

(Continued)

(52) U.S. Cl.
CPC ................ *F02C 7/143* (2013.01); *F01D 25/08* (2013.01); *F01K 23/10* (2013.01); *F02C 1/08* (2013.01); *F02C 3/30* (2013.01); *F02C 3/34* (2013.01); *F02C 6/18* (2013.01); *F02C 7/04* (2013.01); *F05D 2270/082* (2013.01); *Y02E 20/16* (2013.01)

(58) Field of Classification Search
CPC ................ F02C 3/34; F02C 3/30; F02C 1/06; F01K 23/10; Y02E 20/16
USPC .......... 60/39.52, 39.182; 415/77, 84, 83, 58.5
See application file for complete search history.

(56) References Cited

U.S. PATENT DOCUMENTS 3,549,272 A * 12/1970 Bouiller et al. ................ 416/166
4,133,171 A *  1/1979 Earnest et al. ............. 60/39.182

(Continued)

FOREIGN PATENT DOCUMENTS

| DE | 1262074 B * 2/1968 |
| DE | 10 2008 002 870 A1  12/2008 |

(Continued)

OTHER PUBLICATIONS

Switzerland Search Report dated May 4, 2011.

*Primary Examiner* — Phutthiwat Wongwian
*Assistant Examiner* — Marc Amar
(74) *Attorney, Agent, or Firm* — Buchanan Ingersoll & Rooney PC (57) ABSTRACT

A method is disclosed for operating a gas turbine power plant having a gas turbine, a heat recovery steam generator and an flue gas splitter which splits flue gases into a first flue gas flow for recirculation into an inlet flow of the gas turbine and into a second flue gas flow for discharge to an environment. An oxygen-depleted gas can be used in an open cooling system for cooling hot gas parts of the gas turbine. A split compressor intake can be provided for separate feed of recirculated flue gas and fresh air into a compressor intake. Compressor blades can include a separating band which blocks intermixing of recirculated flue gas and fresh air during compression.

10 Claims, 6 Drawing Sheets

(51) Int. Cl.
*F01K 23/10* (2006.01)
*F02C 3/34* (2006.01)
*F02C 6/18* (2006.01)
*F02C 7/04* (2006.01)

(56) References Cited

U.S. PATENT DOCUMENTS

| | | | |
|---|---|---|---|
| 5,988,980 A * | 11/1999 | Busbey et al. | 416/193 R |
| 6,256,976 B1 | 7/2001 | Kataoka et al. | |
| 7,536,252 B1 | 5/2009 | Hibshman, II et al. | |
| 2002/0092303 A1 | 7/2002 | Al-Roub et al. | |
| 2006/0277912 A1 | 12/2006 | Shibata | |
| 2007/0033918 A1 | 2/2007 | Benz et al. | |
| 2008/0309087 A1 | 12/2008 | Evulet et al. | |
| 2010/0180565 A1 | 7/2010 | Draper | |

FOREIGN PATENT DOCUMENTS

| | | |
|---|---|---|
| EP | 0 718 470 A2 | 6/1996 |
| EP | 0 887 530 A2 | 12/1998 |
| EP | 1 223 382 A2 | 7/2002 |
| EP | 1 621 471 A1 | 2/2006 |
| EP | 2 208 876 A2 | 7/2010 |
| EP | 2 248 999 A1 | 11/2010 |
| JP | 2003-343213 A | 12/2003 |
| WO | WO 2010/142573 A2 | 12/2010 |

* cited by examiner

GAS TURBINE POWER PLANT WITH FLUE GAS RECIRCULATION AND OXYGEN-DEPLETED COOLING GAS

RELATED APPLICATION

This application claims priority under 35 U.S.C. §119 to Swiss Patent Application No. 00482/11 filed in Switzerland on Mar. 22, 2011, the entire content of which is hereby incorporated by reference in its entirety.

FIELD

The present disclosure relates to a method for operating a gas turbine power plant with flue gas recirculation in which an oxygen-depleted gas is used for cooling the hot gas parts, and also to a gas turbine power plant with flue gas recirculation.

BACKGROUND INFORMATION

The recirculation of flue gases is a technology which can basically be used for the most diverse purposes in gas turbines, such as for the control of emissions, for the reduction of the flue gas volume, for carbon dioxide separation, etc. During the recirculation of flue gases in a gas turbine, an essential portion of the flue gas is tapped from the overall flue gas flow and, after cooling and scrubbing, is normally returned to the inlet mass flow of the turbine or to the compressor of the turbine, wherein the returned flue gas flow is mixed with fresh air from the environment, and this mixture is then fed to the compressor.

As a result of flue gas recirculation, the carbon dioxide partial pressure in the flue gases can advantageously be increased in order to reduce the power losses and efficiency losses of power plants with carbon dioxide separation. Furthermore, flue gas recirculation has been proposed with the aim of reducing the oxygen content in the intake gases of gas turbines in order to reduce the $NO_x$ emissions as a result.

For flue gas recirculation, U.S. Pat. No. 7,536,252 B1, for example, describes a method for controlling an flue gas recirculation flow of a turbomachine which is fed back via an flue gas recirculation system to the intake of the turbomachine. With this method, a nominal flue gas recirculation portion, which contains the portion of the flue gas flow in the inlet flow of the turbomachine, is specified, and the actual value is adjusted to the nominal value.

A power plant with flue gas recirculation and also a method for operating such a power plant is known from EP2248999, in which, in dependence upon load, the recirculation rate and the temperature to which the recirculated flue gases are recooled are controlled.

It is known to achieve a recirculation rate which is as high as possible. The recirculation rate is generally restricted by the requirements of the combustion chamber, since otherwise the oxygen content of the combustible gases becomes too low and a complete CO-free and UHC (unburnt hydrocarbon)-free combustion cannot be ensured.

It is known that in order to ensure good combustion in the case of low oxygen content in the combustible gases, the fresh air is mixed with the recirculated flue gases as thoroughly as possible in order to provide a homogenous gas mixture upon entry into the combustion chamber. A mixer which is suitable for low pressure-loss mixing of fresh air with recirculated flue gases is known from WO2010/142573 A2, for example.

Despite the feed of a homogeneous gas mixture, the residual oxygen content of the flue gases of such a plant is still relatively high, since in known gas turbines oxygenous gases, by means of the cooling air system, are routed past the combustion chamber and in the turbine or in the combustion chamber are supplied as cooling air without the oxygen contained therein being able to be used for combustion.

SUMMARY

An exemplary embodiment of the present disclosure provides a method for operating a gas turbine power plant having a gas turbine, a heat recovery steam generator and an flue gas splitter for splitting flue gases into a first flue gas flow for recirculation into an inlet flow of the gas turbine and into a second flue gas flow for discharge to an environment. The exemplary method includes providing an oxygen-depleted gas, and cooling hot gas parts of the gas turbine in an open cooling system with oxygen-depleted gas.

An exemplary embodiment of the present disclosure provides a gas turbine power plant with flue gas recirculation. The exemplary plant includes a gas turbine with a governor, a heat recovery steam generator, a compressor intake through which an inlet flow will enter a compressor of the gas turbine. The exemplary plant also includes an flue gas splitter for splitting flue gases into a first flue gas flow for recirculation into an inlet flow of the gas turbine and into a second flue gas flow for discharge to an environment. The compressor intake is split into sectors connected with a flow passage of the compressor, with a feed for fresh air leading through a first sector of the compressor intake, and with a feed for the first flue gas flow leading through a second sector of the compressor intake.

An exemplary embodiment of the present disclosure provides a compressor blade which includes a blade root, and a blade airfoil for a gas turbine configured with flue gas recirculation. The exemplary compressor blade also includes a separating band segment arranged between the blade root and a free end of the blade airfoil facing away from the blade root and forms a right angle to the longitudinal axis of the blade. Separating band segments of all blades of a compressor stage are configured such that when in an installed position, will form an essentially closed annular separating band which lies perpendicular to an axis of a gas turbine to block mixing of recirculated first flue gas flow with fresh air in a compressor.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method for the reliable operation of a gas turbine power plant with flue gas recirculation and an open cooling system for hot gases, in which the residual oxygen of the flue gases is minimized.

According to an exemplary embodiment of the present disclosure, a method is provided for operating a gas turbine power plant having a gas turbine, a heat recovery steam generator and an flue gas splitter for splitting flue gases into a first flue gas flow for recirculation into an inlet flow of the gas turbine and into a second flue gas flow for discharge to an environment. The exemplary method includes providing an oxygen-depleted gas, and cooling hot gas parts of the gas turbine in an open cooling system with oxygen-depleted gas. Accordingly, the exemplary method provides that oxygen-depleted gas is used in an open cooling system for hot gas parts of the gas turbine. In this case, a gas which has an oxygen concentration which is less than the average oxygen concentration of the compressor inlet flow is referred to as oxygen-depleted gas.

This method for operating a gas turbine power plant with flue gas recirculation, which includes a gas turbine, a heat recovery steam generator and an flue gas splitter which splits the flue gases into a first flue gas flow for recirculation into an inlet flow of the gas turbine and into a second flue gas flow for discharging to the environment, is characterized in that an oxygen-depleted gas is used in an open cooling system for cooling hot gas parts of the gas turbine.

As a result of this method, the adding of oxygen-rich cooling gas into the hot gas passage is avoided, and at the same time the oxygen concentration of the gases which reach the combustion chamber is increased compared with known methods. This allows the use of a ratio of fresh air to be recirculated flue gas which is increased compared with known techniques. Overall, in this way, the oxygen content in the flue gases can be reduced, the $CO_2$ content can be increased, and the flue gas mass flow, which leaves the power plant and is separated from the $CO_2$, can be reduced. The reduced flue-gas mass flow allows a reduction in the size of the plant. The higher $CO_2$ content leads to an effective separation with reduced auxiliary power consumption for the $CO_2$ separation and therefore to higher net power and higher net efficiency of the power plant.

For example, for cooling hot gas parts, a gas mixture which consists of over 50% of flue gases of the gas turbine can be used in the method.

Alternatively or in combination, steam can be used as cooling gas in the method. The steam can be extracted from the water-steam cycle of the gas turbine power plant. However, steam from external sources can also be used. By using steam or adding steam into the cooling gas system, the feed of oxygenous gas downstream of the combustion chamber is also reduced.

According to an exemplary embodiment of the method, the first flue gas flow is recirculated into the compressor intake without mixing with fresh air and for cooling hot gases at least a portion of the first flue gas flow, which is compressed or partially compressed in the compressor, is tapped off as cooling gas. The tapped cooling gas is fed directly, or after recooling, to the open cooling system of the hot gas parts. Fresh air is generally ambient air which, depending upon the site of the gas turbine, is cleaned by means of air filters.

In a further development of the method, the first flue gas flow and the fresh air are fed to the compressor in a radially stepped manner.

According to an exemplary embodiment of the method, a radial stepping is realized by the first flue gas flow and the fresh air being fed to the compressor via a split compressor intake, the feed passages of which upstream of the compressor intake have the form of concentric annuluses.

In accordance with an exemplary embodiment, the fresh air is fed to the compressor via an inner annulus, and the first flue gas flow is fed via an outer annulus.

In accordance with an exemplary embodiment, the first flue gas flow is introduced into the inlet flow upstream of the compressor intake via a multiplicity of feeds which are arranged in the circumferential direction on a ring which is concentric to the axis of the gas turbine.

With homogenous inflow of fresh air, the first flue gas flow is recirculated into the inlet flow with equal flow rate in each case via a multiplicity of feeds, for example, which are arranged with uniform distribution in the circumferential direction.

Since the compressor intake of a gas turbine is generally constructed with fixed geometry, the area ratio of the intake areas for fresh air and first flue gas flow is constant and selected in accordance with the design conditions of the gas turbine, for example, it corresponds to the ratio of fresh air to recirculated flue gas at design condition. As soon as the gas turbine is operated outside of design conditions, the ratio of fresh air to recirculated flue gas changes, which leads to an optimum operation. Full load is generally selected as the design condition. For starting the gas turbine power plant and at partial load, less flue gas, for example, is recirculated in this case. In order to nevertheless realize a homogenous inflow to the compressor, in a further embodiment of the method, at partial load and/or during start-up of the gas turbine, fresh air is added to the flue gas flow via a control element before this is introduced into the compressor.

In addition to the method, a gas turbine power plant for implementing the method with flue gas recirculation is provided. Such a power plant includes a gas turbine with compressor intake, a heat recovery steam generator, and an flue gas splitter which splits the flue gases into a first flue gas flow for recirculation into an inlet flow of the gas turbine, and into a second flue gas flow for discharging to the environment. According to an exemplary embodiment of the present disclosure, the compressor intake is split into sectors which at the compressor intake open into the flow passage of the compressor, wherein a feed for fresh air leads through a first section of the compressor intake and a feed for the first flue gas flow leads through a second sector of the compressor intake.

In accordance with an exemplary embodiment of the gas turbine power plant, the first sector and the second sector of the compressor intake are constructed as concentric annuluses at the connection to the flow passage of the compressor. The two gas flows are distributed to these sectors as homogenously as possible. From these sectors of the compressor intake, both gas flows enter the compressor as far as possible without intermixing and at homogenous speed.

In accordance with an exemplary embodiment of the gas turbine power plant, the area ratio of the connecting area of the first sector of the compressor intake to the flow passage of the compressor to the connecting area of the second sector of the compressor intake to the flow passage of the compressor is selected so that at design conditions of the gas turbine it is equal to the ratio of the volumetric flows of drawn-in fresh air to the recirculated first flue gas flow.

In accordance with an exemplary embodiment of the gas turbine power plant, a multiplicity of feed passages for introducing the first flue gas flow into the compressor are circumferentially distributed in the compressor intake on a circle concentrically to the axis of the gas turbine.

In accordance with an exemplary embodiment of the gas turbine power plant, provision is made for a control element which allows a controlled adding of fresh air to the recirculated first flue gas flow. This control element, to which is fed ambient air via a pipe or an air duct, is a flap or a valve, for example. In order to compensate for pressure losses of the control element and of the feed and also of the admixing, a blower can be provided in the feed line.

In order to realize a better separation of the intake air from the recirculated flue gases in the compressor, the first flue gas flow may be introduced on the outer diameter of the compressor intake and the fresh air is introduced on the inner diameter, since the density of the recirculated flue gas es is higher than that of air on account of the $CO_2$ content. The density difference, on account of the radial components of the flow velocity and the higher volume-specific centrifugal forces of the flue gas resulting therefrom, leads to a stratification in the compressor or reduces the intermixing of recirculated flue gas flow and fresh air in the compressor.

A large part of the cooling air of a gas turbine may be tapped from the outer wall of the compressor casing via compressor bleed points. If in such a gas turbine the recirculated flue gases are fed on the outer diameter of the compressor intake and intermixing with fresh air is avoided, the recirculated $CO_2$-rich flue gases are extracted in the compressor and directed past the combustion chamber as cooling gas, whereas an oxygen-rich flow remains in the compressor and is fed from the compressor exit to the combustion chamber.

In order to reduce the intermixing of first flue gas flow and fresh air in the compressor, a compressor blade with separating band segment for a gas turbine with flue gas recirculation is additionally provided. This compressor blade includes a blade root and a blade airfoil, wherein a separating band segment is arranged between blade root and the free end of the blade airfoil facing away from the blade root. This separating band segment can form a right angle to the longitudinal axis of the blade. In the normal installed position, the separating band segments of all the blades of a compressor stage form an essentially closed ring which lies perpendicularly to the axis to the gas turbine and block mixing of the recirculated first flue gas flow with fresh air.

Separating band segments can be provided on stator blades and on rotor blades. On account of the resulting increased centrifugal forces, in accordance with an exemplary embodiment, separating band segments are provided only on the stator blades.

In accordance with an exemplary embodiment, in at least one compressor stage separating band segments are provided only on the rotor blades and no separating band segments are provided on the stator blades. This can be advantageous in the case of variable guide vanes, for example, since the separating band segments of the guide vanes would run into each other during an adjustment of the guide vane position, or if, in order to ensure adjustability, they are of a shortened or rounded construction, which would negatively influence the aerodynamic characteristics of the stage.

In accordance with an exemplary embodiment, the separating band segments are provided only up to the first or up to the second compressor bleed point, since up to there compressed, extremely oxygen-depleted recirculated flue gases can be effectively extracted from the compressor.

All the explained advantages are applicable not only in the specified combinations in each case but also in other combinations or alone without departing from the scope of the disclosure. For example, instead of using an flue gas blower, a booster can be provided.

The present disclosure is applicable without limitation to gas turbines with a combustion chamber and also to gas turbines with sequential combustion, as are known from EP0718470, for example.

Figure 1:
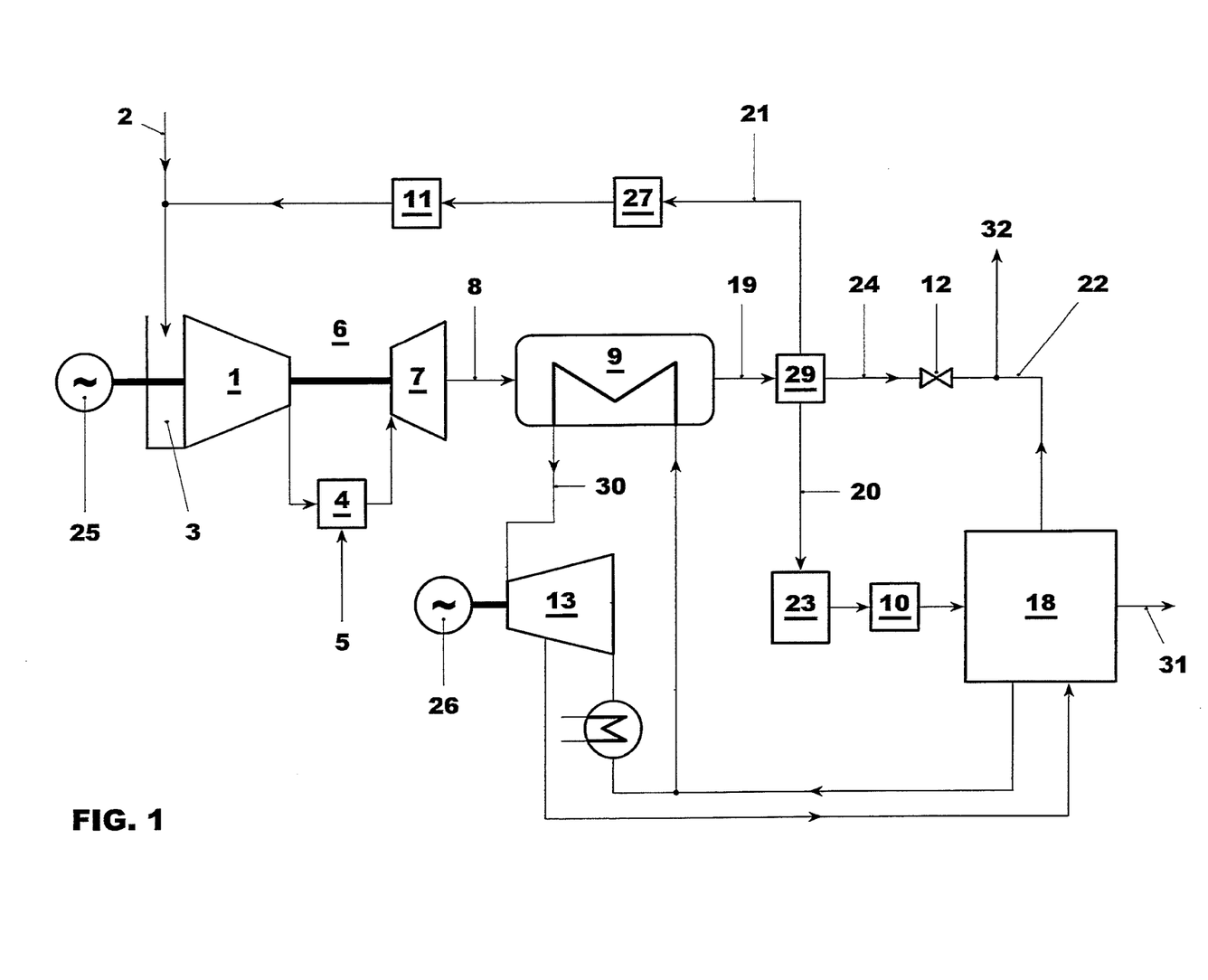
FIG. 1 shows a schematic view of a gas turbine power plant with recirculation of the flue gases according to a known technique.

FIG. 1 shows elements of a gas turbine power plant in schematic view. The gas turbine 6 includes a compressor 1, and the combustion air which is compressed therein is fed to a combustion chamber 4 and combusted there with fuel 5. The hot combustion gases are then expanded in a turbine 7. The useful energy which is produced in the turbine 7 is then converted into electrical energy by a first generator 25, for example, which is arranged on the same shaft.

The hot flue gases 8 which discharge from the turbine 7, for optimal utilization of the energy still contained therein, are used in a heat recovery steam generator (HRSG) 9 for producing live steam 30 for a steam turbine 13 or for other plants. The useful energy which is produced in the steam turbine 13 is then converted into electrical energy by a second generator 26, for example, which is arranged on the same shaft. The water-steam cycle is simplified in the example and shown only schematically. Various pressure stages, feedwater pumps, etc., are not shown since these are not the subject of the disclosure.

In such a plant, a portion of the flue gases 19 from the waste heat steam generator is split downstream of the heat recovery steam generator 9 in a flow splitter 29, which can be controlled, into a first flue gas partial flow 21 and a second flue gas partial flow 20. The first flue gas partial flow 21 is recirculated to the intake duct of the gas turbine 6 and mixed with fresh air 2 there. The second flue gas partial flow 20, which is not recirculated, may be further cooled in an flue gas recooler 23 and fed to a $CO_2$ separation system 18. From this, $CO_2$-depleted flue gases 22 are discharged to the environment via an exhaust stack 32. In order to overcome the pressure losses of the $CO_2$ separation system 18 and of the flue gas duct, an flue gas blower 10 can be provided. The $CO_2$ 31 which is separated in the $CO_2$ separation system 18 may be compressed and discharged for storage or for further treatment. The $CO_2$ separation system 18 is supplied with steam tapped from the steam turbine 13 via steam extraction.

The second flue gas partial flow can also be routed to the exhaust stack 32 via an flue gas bypass 24.

The recirculated flue gas flow 21 is cooled to a little above ambient temperature in an flue gas recooler 27 which can be equipped with a condenser. Downstream of this flue gas recooler 27, a booster or flue gas blower 11 can be arranged for the recirculation flow 21. This recirculated flue gas flow 21 is mixed with fresh air 2 before the mixture is fed as inlet flow via the compressor intake 3 of the gas turbine 6.

Figure 2:
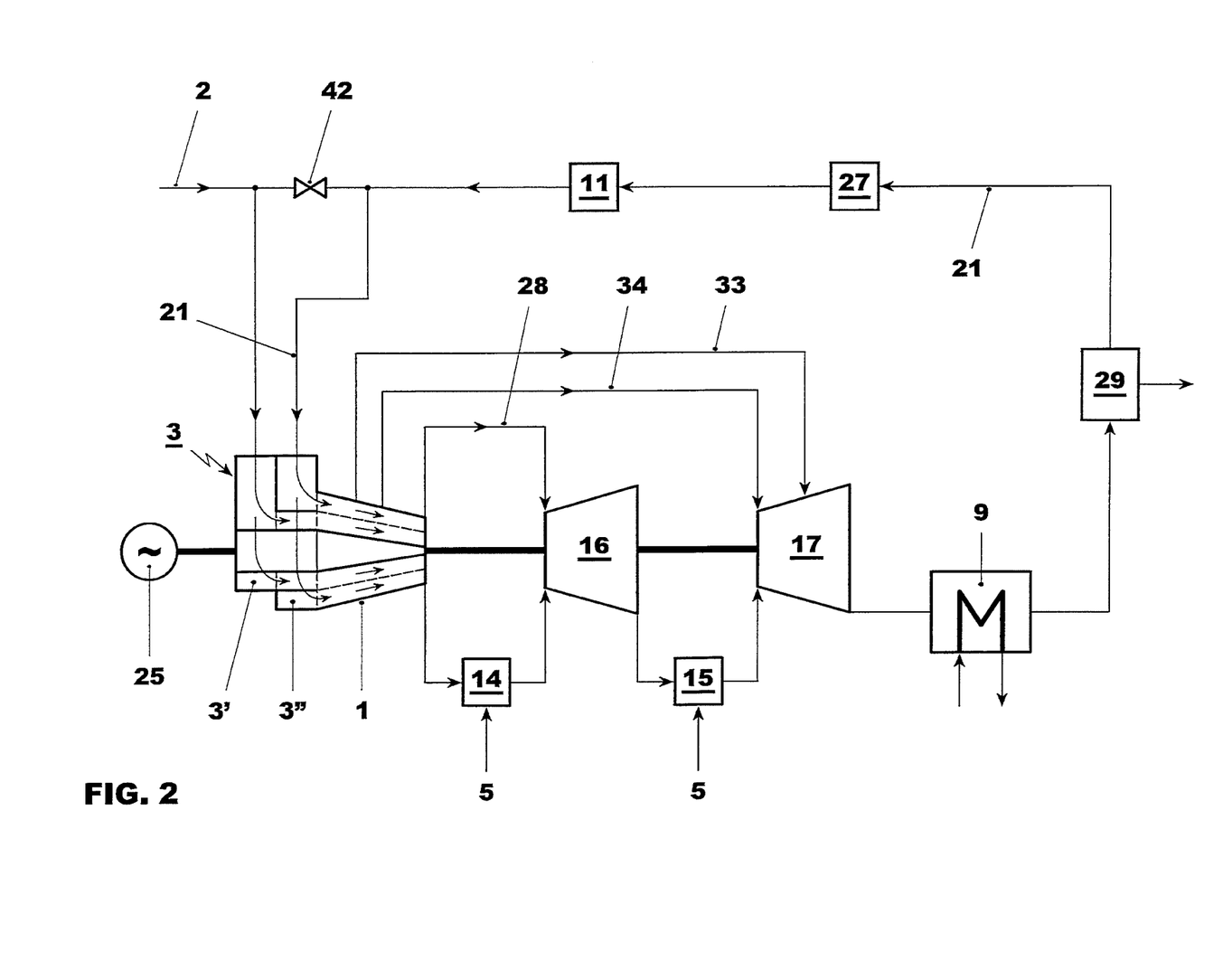
FIG. 2 shows a schematic view of a gas turbine power plant with recirculation of the flue gases and coaxial introduction of flue gases and fresh air into the compressor according to an exemplary embodiment of the present disclosure.

In contrast to FIG. 1, a gas turbine with sequential combustion is shown in FIG. 2 according to an exemplary embodiment of the present disclosure. The method is applicable to gas turbines with one combustion chamber and also to gas turbines with sequential combustion. Accordingly, embodiments for gas turbines with one combustion chamber are also to be realized.

FIG. 2 schematically shows an exemplary embodiment of a gas turbine power plant with a compressor intake which is split into two sectors, wherein a feed for fresh air leads to a fresh air intake section 3' of the compressor intake 3 and a feed for the first flue gas flow 21 leads to an flue gas intake sector 3" of the compressor intake 3. The two intake sectors 3', 3", on the side of the compressor intake 3 facing the compressor, directly adjoin the flow passage of the compressor 1. The fresh air intake sector 3' in this case leads to an inner annular area of the flow passage and the flue gas intake sector 3" leads to an outer annular area of the flow passage.

Low-pressure and intermediate-pressure cooling gas 33, 34 is tapped from the radial outer wall of the compressor 1 and fed to the hot gas parts of the gas turbine of cooling. In addition, high-pressure cooling gas 28 is tapped at the exit of the compressor from the radial outer wall of the compressor or of the adjoining diffuser and fed to the hot gas parts of the gas turbine for cooling. In FIG. 2, for simplicity, only one cooling gas feed to the high-pressure turbine 16 and to the low-pressure turbine 17 is shown. For simplicity, a cooling-gas feed to the combustion chambers 14, 15 is not shown, wherein the high-pressure combustion chamber 14 may be cooled with high-pressure cooling air 28 and the low-pressure combustion chamber 15 may be cooled with intermediate-pressure cooling air 34. Since the recirculated flue gases are directed into the outer region of the compressor these are circulated to a large extent as cooling gas 33, 34, 28 around the combustion chambers 14, 15, while the oxygen-rich fresh air is compressed in the core region of the compressor 1 up to the compressor exit and finds its way into the high-pressure combustion chamber 14. As a result of the division of the gas feed in the intake 3, a larger portion of oxygen-rich fresh air is directed into the combustion chamber 14. Therefore, the oxygen portion in the inlet gases of the low-pressure combustion chamber 15 is also significantly increased compared with a plant in which the recirculated flue gases 21 are mixed with fresh air 2.

In order to realize a homogenous velocity profile in the inflow to the compressor during various operating states of the gas turbine and during the changes of the portion of recirculated flue gas 21 and of the compressor intake volume associated therewith, provision is made in the exemplary embodiment shown in FIG. 2 for a control element via which fresh air 2 is added to the first flue gas flow 21 before this is introduced into the compressor 1 via the second sector 3" of the compressor intake.

Figure 3:
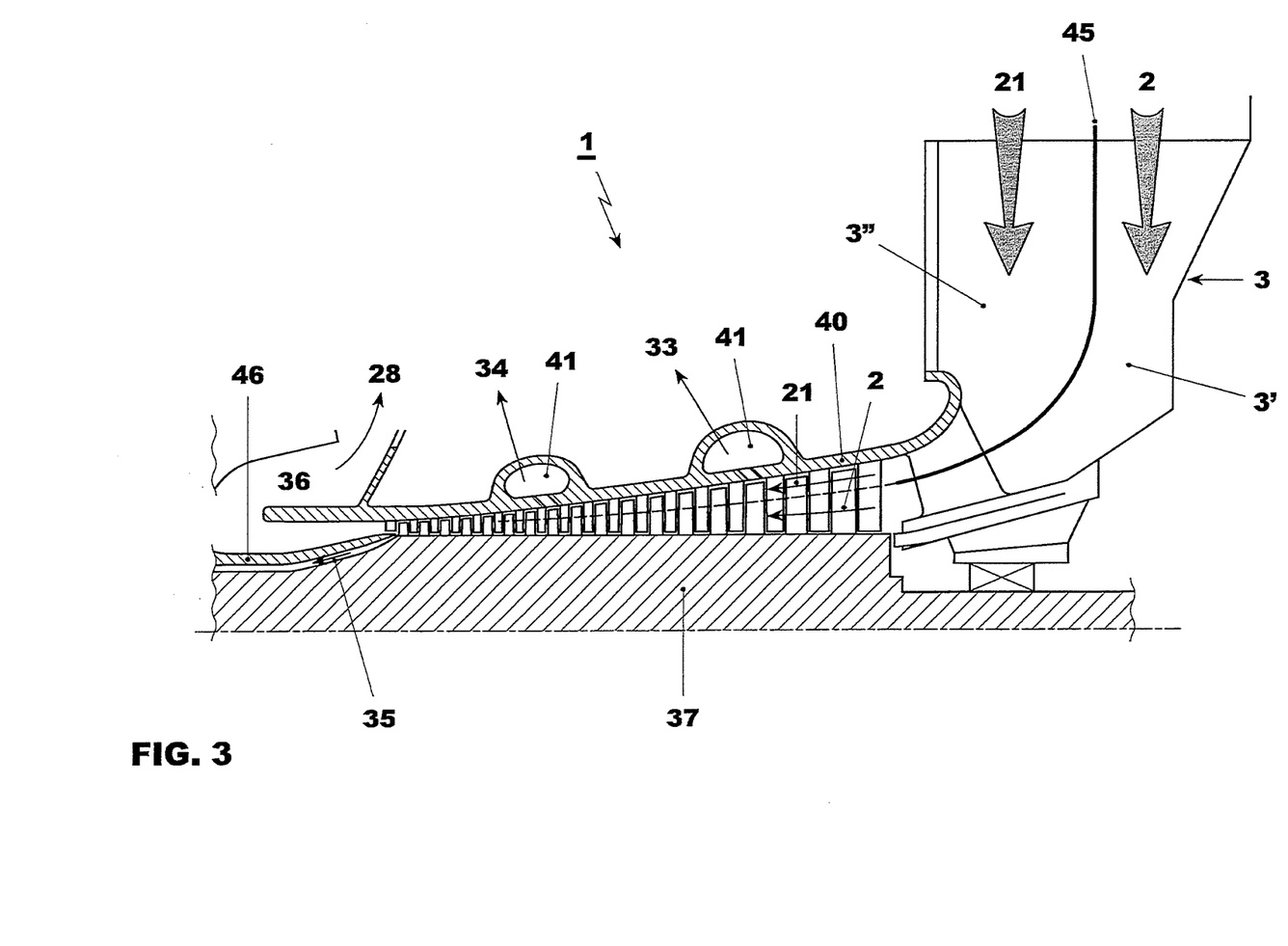
FIG. 3 shows a schematic view of a split compressor intake and compressor of a gas turbine power plant with recirculation of flue gases according to an exemplary embodiment of the present disclosure.

FIG. 3 schematically shows an exemplary embodiment of a split compressor intake and a compressor of a gas turbine power plant with recirculation of the flue gases. In the depicted example, the compressor intake 3 is split by means of an intake baffle plate 45 into an outer compressor intake sector 3' for fresh air and into a compressor intake sector 3" for recirculated flue gases. This splitting of the compressor intake 3 leads to an essentially coaxial inflow of recirculated flue gas 21 and fresh air into the compressor 1. In the depicted example, the fresh air 2 is compressed in the compressor 1 by means of an inner annulus which is adjacent to the rotor 37. The recirculated flue gases 21 are compressed in the compressor 1 in an outer annulus which is adjacent to the compressor casing 40. In the depicted example, gas for the secondary gas system of the gas turbine 6 is tapped at two points of the compressor 1 via compressor bleed points 41. The secondary gas is generally used for cooling hot gas parts and, depending upon design, is also used in the bearing region, for example, as purging air or seal air. Low-pressure cooling gas 33 is tapped from the first bleed point 41 and intermediate-pressure cooling gas 34 is tapped from the second bleed point 41. High-pressure cooling gas 28 is tapped from the compressor plenum 36.

In the depicted example, rotor cooling gas 35 is also tapped at the exit of the compressor 1 between a shaft cover 46 and the rotor 37. In order to reduce the fresh air portion of the rotor cooling air 35, in accordance with an exemplary embodiment, the compressor intake may be split into 3 coaxial sectors. These sectors can include, for example, an outer and an inner sector in each case for introducing recirculated gases 21 and a center sector for introducing fresh air 2.

Figure 4:
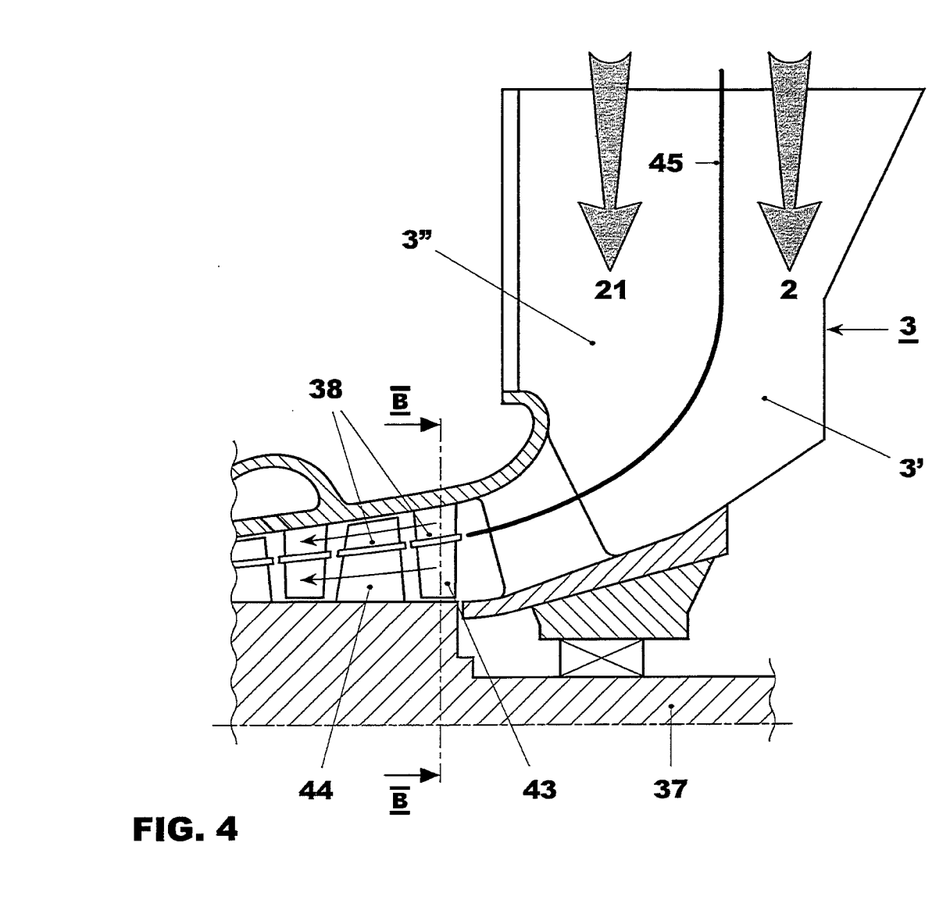
FIG. 4 shows a schematic view of a compressor intake and compressor of a gas turbine with recirculation of the flue gases and separating band segments on compressor stator blades and compressor rotor blades according to an exemplary embodiment of the present disclosure.

Also, with a coaxial feed of fresh air 2 and recirculated flue gas 21, intermixing of fresh air 2 and recirculated flue gas 21 occurs on account of secondary flows in the compressor 1. This can reduce the positive effect of the separate feed of fresh air 2 and recirculated flue gas 21 in the compressor intake. In order to minimize this intermixing in the compressor 1, a compressor with blades with separating band segments is proposed. Shown in FIG. 4 is an exemplary embodiment in which all the compressor stator blades 43 and all the compressor rotor blades 44 are constructed with separating band segments 38 which in the assembled state in each stage are connected to form a continuous separating band.

Shown in section B-B, by way of example of the first compressor stage, is a construction of a separating band. In the example, a separating band segment 38 is arranged on each rotor blade at about 50% of the height of the blade airfoil and extends in the radial direction essentially perpendicularly to the blade airfoil.

Figure 5:
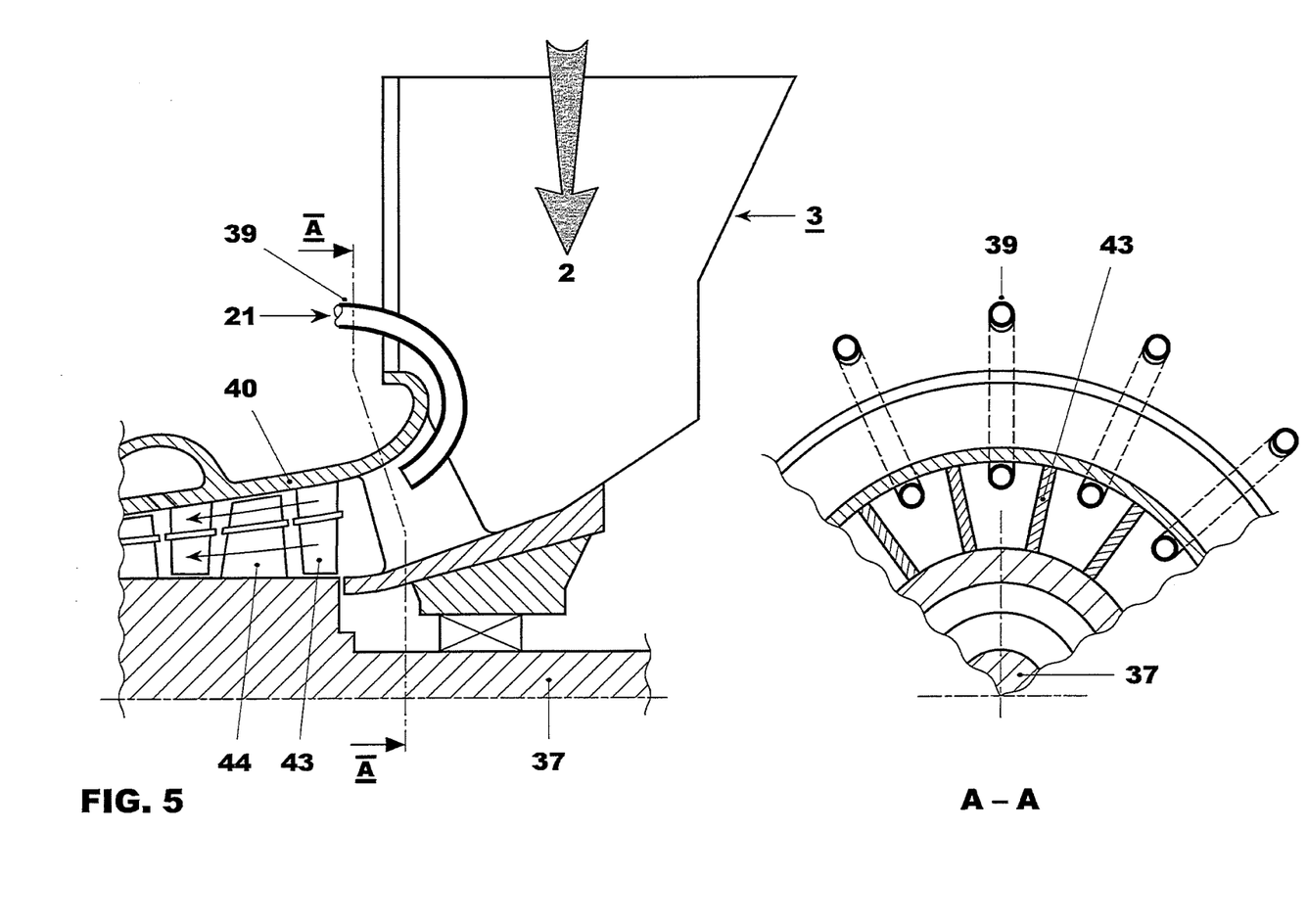
FIG. 5 shows a schematic view of a compressor intake and compressor of a gas turbine power plant with recirculation of flue gases via a multiplicity of feed passages which are arranged in the compressor intake annularly around the gas turbine axis according to an exemplary embodiment of the present disclosure.

FIG. 5 shows an alternative feed of the recirculated flue gases 21. Instead of a separate feed of the recirculated flue gases 21 via a compressor intake sector 3" for recirculated flue gases, use is made of an unsplit compressor intake 3 into which the recirculated flue gases 21 are introduced via a multiplicity of inlet passages 39 which are arranged in a ring-like manner on the outer wall of the intake duct 3. Pipe ends or pipe stubs, for example, the outlet ends of which are oriented parallel to the main flow in the direction of the compressor intake, are suitable as an inlet passage 39. In the depicted example, the pipe stubs reach right into the inlet nozzle (bellmouth) of the compressor 1 in order to minimize intermixing with fresh air 2.

The pipe stubs can also terminate in the actual compressor intake or even terminate on the wall of the compressor intake. The ends may be arranged annularly around the axis of the gas turbine.

The construction with a multiplicity of inlet passages 39 has the advantage that there is no requirement for an intake baffle plate 45 for splitting of the compressor intake 3. During operation this has the advantage that the ratio of fresh air to recirculated flue gas can be altered independently of the area ratio of the intake sectors.

Figure 6:
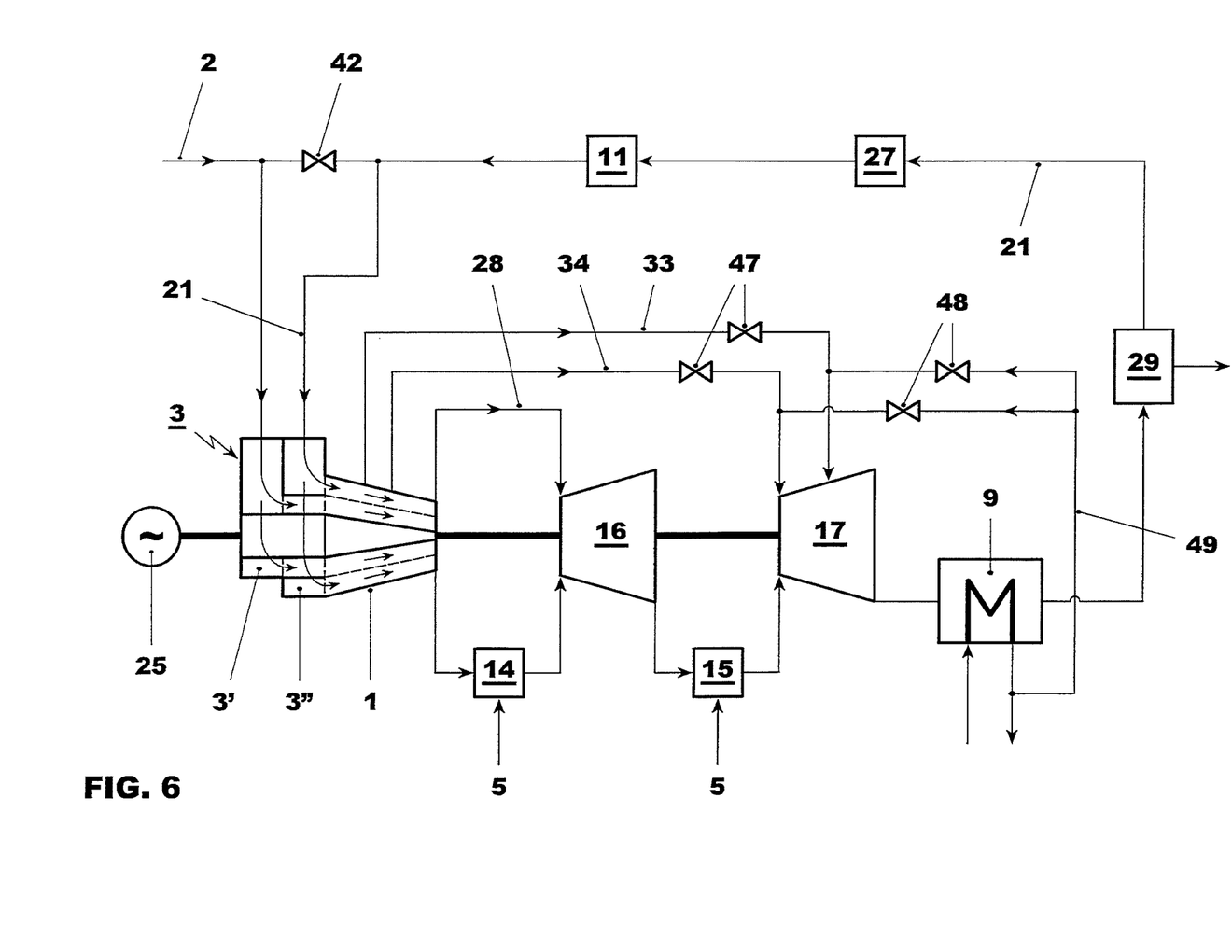
FIG. 6 shows a schematic view of a gas turbine power plant with steam cooling according to an exemplary embodiment of the present disclosure.

FIG. 6 is based on FIG. 2 and schematically shows an exemplary embodiment in which the feed of steam into the cooling system is additionally possible. For this, a steam line 49, which leads to the cooling gas system of the gas turbine, branches from the water-steam cycle. Shown in the depicted example is a steam line 49 which is branched into the lines for the feed of the low-pressure and intermediate-pressure cooling gas system 33 and also of the high-pressure cooling gas system 34. Alternatively, steam at different pressure levels from the water-steam cycle or alternative sources can also be used and introduced into the cooling gas lines of the gas turbine at corresponding pressure levels.

In order to be able to carry out cooling between cooling with steam or with compressor cooling gas or with a combination of both, cooling gas valves 47 are provided in the lines for low-pressure and intermediate-pressure cooling gas 34 and steam valves 48 are provided in the steam lines 49. If the cooling gas valves 47 are opened and the steam valves 48 are closed, during start-up or during operation at low partial load of the gas turbine, for example, the cooling gas system can conventionally operate with cooling gas from the compressor 1. As soon as sufficient steam is available, the cooling gas valves 47 can be closed and the steam valves 48 can be opened in order to carry out steam cooling. The steam cooling can wholly or partially replace the cooling gas cooling. The steam cooling can be realized in combination with the coaxial introduction of recirculated first flue gas partial flow 21 and fresh air 2 into the compressor 1, which is shown in FIG. 6, or in combination with a conventional intermixing of fresh air 2 and recirculated first flue gas partial flow 21 upstream of the compressor 1 (corresponding to FIG. 1; not shown here).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Compressor
2 Fresh air
3 Compressor intake
3' First sector: compressor intake sector for fresh air
3" Second sector: compressor intake sector for recirculated flue gases
4 Combustion chamber
5 Fuel
6 Gas turbine
7 Turbine
8 Hot flue gases of the gas turbine
9 Heat recovery steam generator (HRSG)
10 Flue gas blower for the second flue gas partial flow (for $CO_2$ separation system)
11 Flue gas blower for the first flue gas partial flow (flue gas recirculation)
12 Bypass flap or valve
13 Steam turbine
14 High-pressure combustion chamber
15 Low-pressure combustion chamber
16 High-pressure turbine
17 Low-pressure turbine
18 $CO_2$ separation system
19 Flue gas from the heat recovery steam generator
20 Second flue gas partial flow (flue gas line to the $CO_2$ separation system)
21 First flue gas partial flow (flue gas recirculation)
22 $CO_2$-depleted flue gas
23 Flue gas recooler (for the second flue gas partial flow)
24 Flue gas bypass to the exhaust stack
25 First generator
26 Second generator
27 Flue gas recooler (for the first flue gas partial flow)
28 High-pressure cooling gas
29 Flue gas splitter
30 Live steam
31 Separated $CO_2$
32 Exhaust stack
33 Low-pressure cooling gas
34 Intermediate-pressure cooling gas
35 Rotor cooling gas
36 Compressor plenum
37 Rotor
38 Separating band segment
39 Feed passage
40 Compressor casing
41 Compressor bleed point
42 Fresh air control element
43 Compressor stator blade
44 Compressor rotor blade
45 Intake baffle plate
46 Shaft cover
47 Cooling gas valve
48 Steam valve
49 Steam line

What is claimed is:

1. A gas turbine power plant with flue gas recirculation, comprising:
   a gas turbine;
   a heat recovery steam generator (HRSG);
   a compressor intake through which an inlet flow will enter a compressor of the gas turbine; and
   a flue gas splitter positioned downstream of the HRSG, the flue gas splitter configured to split flue gases into a first flue gas flow for recirculation into the inlet flow of the gas turbine and into a second flue gas flow for discharge to an environment,
   wherein the compressor intake is split into sectors connected with a flow passage of the compressor, the sectors comprising a first sector and a second sector, a feed for fresh air leading through the first sector of the compressor intake, and a feed for the first flue gas flow leading through the second sector of the compressor intake;
   an intake baffle plate configured to divide the first sector and the second sector; and
   wherein the first sector and the second sector of the compressor intake are constructed as concentric annuluses radially separated by the intake baffle plate at a connection of the compressor intake to the flow passage of the compressor to define coaxial flow paths for the intake flow received by the compressor intake.

2. The gas turbine power plant as claimed in claim 1, wherein an area ratio of a connecting area of the first sector for the flow passage of the compressor to a connecting area of the second sector for the flow passage of the compressor is selected to be equal to a ratio of non-zero volumetric flows of supplied fresh air to the first flue gas flow during design conditions of the gas turbine.

3. The gas turbine power plant as claimed in claim 1, comprising:
   a multiplicity of feed passages for introducing the first flue gas flow into the compressor, arranged in the compressor intake in a circumferentially distributed manner on a circle which is concentric to an axis of the gas turbine.

4. The gas turbine power plant as claimed in claim 1, comprising:
   stator-blade separating band segments and/or rotor-blade separating band segments on compressor blades configured to block mixing of gases of recirculated first flue gas flow with fresh air in the compressor.

5. The gas turbine power plant as claimed in claim 1, wherein the first sector is positioned inwardly of the second sector such that the first sector is closer to a rotor of the compressor than the second sector, the first and second sectors being configured such that the feed for fresh air leading through the first sector of the compressor intake and the feed for the first flue gas flow leading through the second sector of the compressor intake form a coaxial inflow of recirculated flue gas and fresh air into the compressor.

6. The gas turbine power plant as claimed in claim 3, comprising:
   stator-blade separating band segments and/or rotor-blade separating band segments on compressor blades that are configured to block mixing of gases of recirculated first flue gas flow with fresh air in the compressor.

7. The gas turbine power plant as claimed in claim 6, comprising:
   a diffuser connected to an exit of the compressor such that compressed gas is passable from the compressor to the diffuser; and
   a control element configured to control adding of fresh air to the recirculated first flue gas flow.

8. A compressor blade, comprising:
   a single blade root configured to be connected to a rotor of a compressor or a casing of a compressor;
   a single blade airfoil for a gas turbine configured with flue gas recirculation, the blade airfoil configured to connect to the blade root to extend from the blade root;
   a single separating band segment attached to the blade airfoil and arranged between the blade root and a free end of the blade airfoil facing away from the blade root and forms a right angle to a longitudinal axis of the blade airfoil, the airfoil being constructed with the separating band segment such that the band segment extends radially having a first portion extending past a first side of the blade airfoil to a first free end and a second portion extending past a second side of the blade airfoil to a second free end, the second side of the blade airfoil being opposite the first side of the blade airfoil;
   wherein the separating band segment is configured to be positioned adjacent to separating band segments of other blades to be attached to a compressor stage such that, when the compressor blade is in an installed position, the separating band segment is positioned adjacent to the separating band segments of the other blades to form an essentially closed annular separating band which lies perpendicular to an axis of a gas turbine that is configured to block mixing of recirculated first flue gas flow with fresh air in a compressor; and
   wherein the compressor stage includes a stator blade having a second single separating band downstream from the blade root.

9. The compressor blade of claim 8, wherein the blade airfoil and the separating band are constructed as a single piece.

10. The compressor blade of claim 9, wherein the blade root is a foot.

* * * * *